United States Patent [19]

Eloranta

[11] 3,731,080
[45] May 1, 1973

[54] HEADLAMP POLARIZING ATTACHMENT

[75] Inventor: Vaito K. Eloranta, Needham, Mass.
[73] Assignee: Polaroid Corporation, Cambridge, Mass.
[22] Filed: June 28, 1971
[21] Appl. No.: 157,145

[52] U.S. Cl. ............................................ 240/9.5
[51] Int. Cl. ......... F21v 9/14, G02b 5/30, G02b 27/28
[58] Field of Search .................. 240/9.5; 350/147, 350/156

[56] References Cited

UNITED STATES PATENTS 3,513,305  5/1970  Joncas ..................................... 240/9.5
2,810,324  10/1957  Marks ................................. 240/9.5 X

FOREIGN PATENTS OR APPLICATIONS 486,836  6/1938  Great Britain ......................... 240/9.5

Primary Examiner—Louis R. Prince
Assistant Examiner—Frederick Shoon
Attorney—Charles Mikulka et al.

[57] ABSTRACT

This concept is directed to a headlamp polarizing attachment using a linear polarizer having a spherical shape with asymmetric receptacles formed in it. The attachment fits on a standard automobile headlamp when it is positioned so the receptacles will receive aiming bosses which are an integral part of the headlamp. Positioning the attachment to fit on the headlamp orients the transmission azimuth of the polarizer so it is at 45° to the horizontal when the headlamp is mounted on an automobile. This application is further directed to a special gasket for sealing the headlamp polarizing attachment to the headlamp.

21 Claims, 8 Drawing Figures

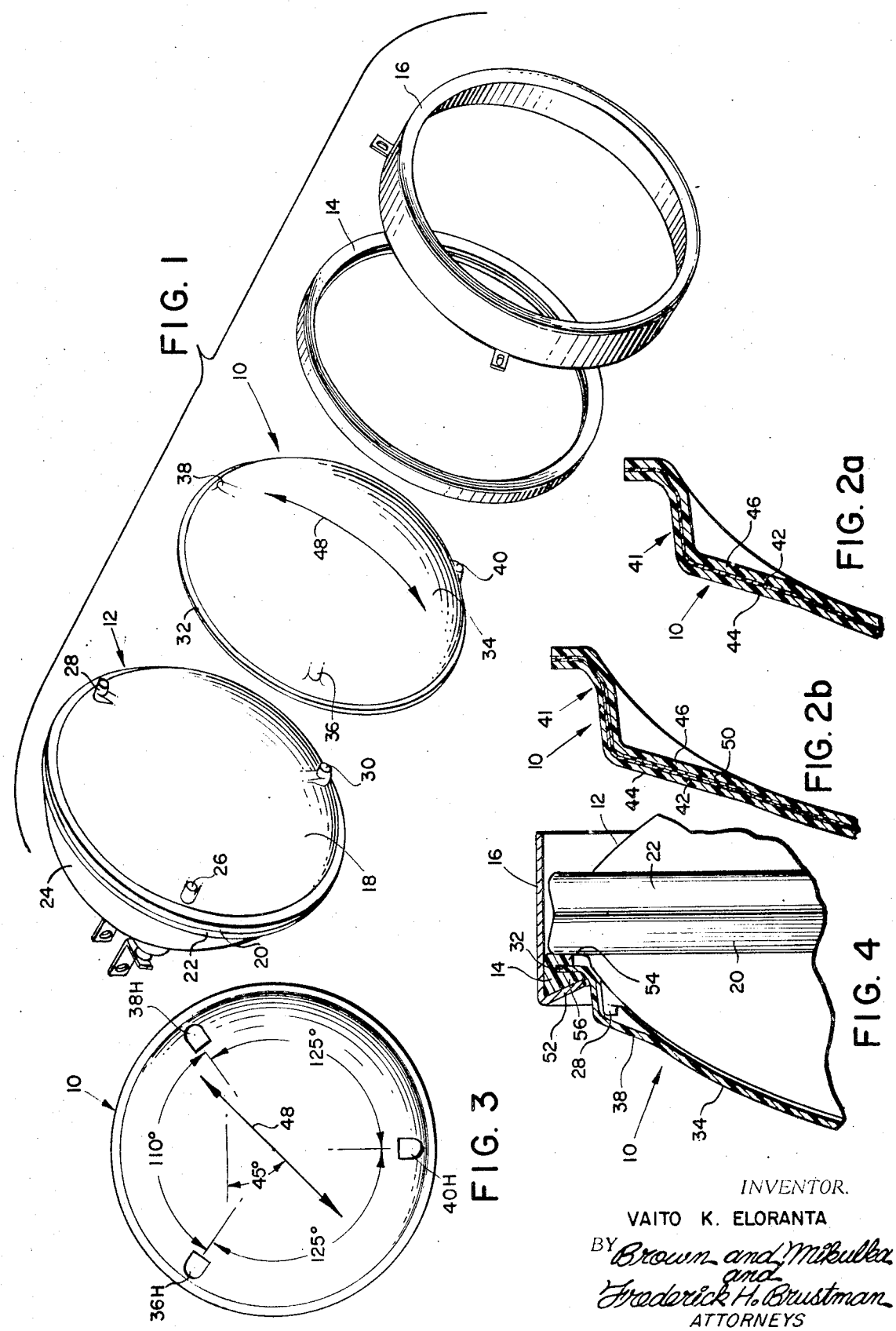

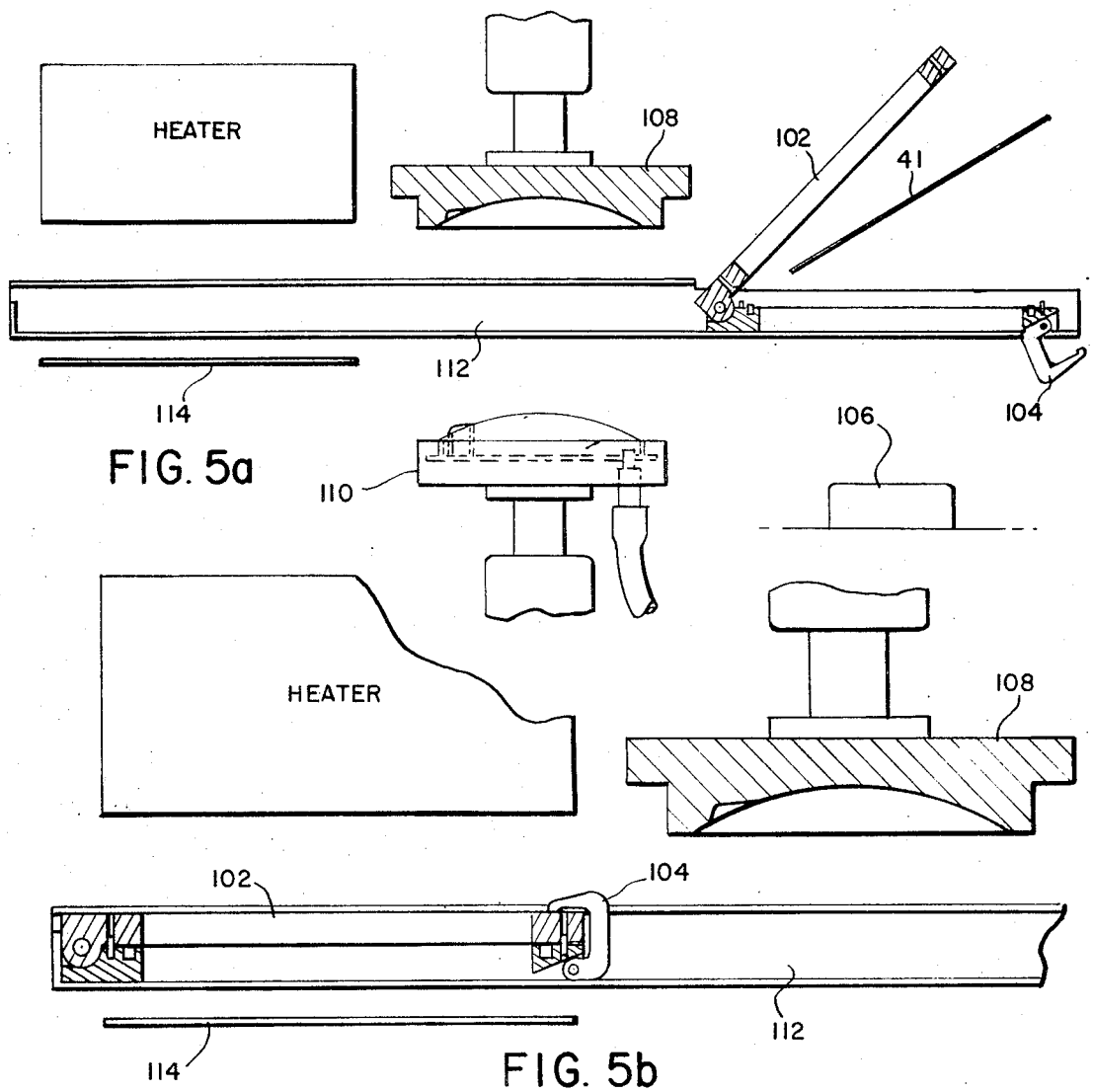
FIG. 5a
FIG. 5b
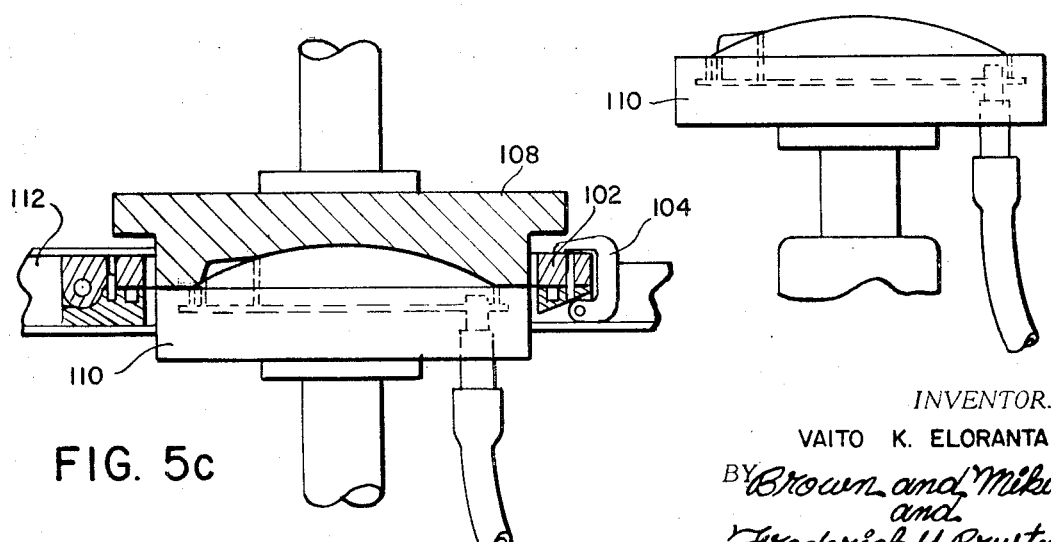
FIG. 5c 3,731,080

HEADLAMP POLARIZING ATTACHMENT

BACKGROUND OF THE INVENTION

The present concept relates to the promotion of highway safety by providing an inexpensive attachment to polarize automobile headlamps as part of an anti-glare system for highway use. The purpose is to prevent the headlamps of an oncoming vehicle from blinding a driver.

Systems for accomplishing this goal are known to the art; see, for example, U.S. Pat. No. 2,031,045, issued to Edwin H. Land. In any polarized anti-glare system, the orientation of the polarizer is quiet important. If a polarizer is installed on a headlamp with the wrong orientation, the headlamp might then blind a driver in an oncoming vehicle because his viewing portion of the system cannot sufficiently attenuate the light of the improperly polarized headlamp.

Previous solutions to the specific problem of how to polarize the light emitted by an automobile headlamp have required the use of extremely complex polarizing structures (see U.S. Pat. No. 2,887,566) or specialized manufacturing processes (see U.S. Pat. No. 2,284,590). It has also been suggested that a separate polarizer might be laminated onto a headlamp with an outer layer of glass to protect it. This is a difficult and expensive process even when applied to special headlamps having flat lenses rather than the standard curved lenses.

An object of the present invention is to provide a simple attachment for polarizing light emitted by an automobile headlamp.

Another object is to provide a polarizing attachment that can only be assembled to an automobile headlamp with a unique orientation of its transmission azimuth.

Another object of the present invention is to provide means to seal a polarizer to a headlamp so as to prevent the accumulation of dirt and moisture between the polarizer and the headlamp.

Still another object of the present invention is a method of accurately manufacturing a headlamp polarizing attachment so it will have a specific orientation of its transmission azimuth with respect to the roadway when mounted on an automobile headlamp.

SUMMARY OF THE INVENTION

These and other objects of the invention are accomplished by a laminate comprising a very thin polarizing layer between two moldable plastic layers which provide both support and protection for the polarizing layer. The laminate is heated and then pressed between heated male and female dies. The dies impress a comparatively steep spherical curvature and three asymmetrically located receptacles into the laminate. Vacuum-forming techniques promote the accurate copying of the mold by the laminate. Prior to pressing the laminate between the dies, it is carefully aligned so the transmission azimuth of the polarizer will have a specific orientation with respect to the asymmetrically located receptacles. After excess material is trimmed from the polarizer, it is fitted into a specially contoured gasket. The gasket seals the polarizer to an automotive headlamp assembly when it is clamped in place by a bezel. The contour is such that the gasket will perform its function with any bezel normally used to retain a headlamp.

DESCRIPTION OF THE DRAWINGS

Other objects and many of the attendant advantages of the present invention will be better appreciated and said invention will become more clearly understood by reference to the following detailed description when considered in conjunction with the accompanying drawings illustrating one embodiment of the instant invention, wherein:

FIG. 1 illustrates a headlamp polarizing attachment and its order of assembly with other elements;

FIGS. 2a and 2b illustrate cross-sections through two types of headlamp polarizing attachments;

FIG. 3 illustrates a frontal view of a headlamp polarizing attachment;

FIG. 4 illustrates a cross-section through a headlamp polarizing attachment assembled to a headlamp; and FIGS. 5a, 5b, and 5c illustrate steps in a process for forming a headlamp polarizing attachment.

THE PREFERRED EMBODIMENT

Reference should be had to FIG. 1 which shows a headlamp polarizing attachment 10, a headlamp 12, a gasket 14, and a bezel 16 separated along the axis of headlamp 12 for clarity. The headlamp 12 is of the type commonly used in passenger automobiles. It comprises a 12.5 cm radius spherical lens 18 having a rim 20 by which the lens is joined to another rim 22 which is integral with a reflector 24. The lens 18 has three aiming bosses 26, 28, and 30 formed at its periphery near the rim 20. The aiming bosses 26, 28, and 30 are asymmetrically placed about the axis of the headlamp 12. The angle between the aiming boss 30 and either the aiming boss 26 of the aiming boss 28 is about 125°, whereas the angle between aiming boss 26 and aiming boss 28 is about 110°. The foregoing measurements are approximate; the exact measurements are well known to the automotive headlamp industry. The headlamp 12 has standard mechanical indicia (not shown) to insure it will be assembled in an automobile with a predetermined orientation, generally with aiming boss 30 lowermost.

The headlamp polarizing attachment has a spherical shell 34, whose radius corresponds to that of the spherical lens 18, and a rim 32, whose dimensions correspond to those of the headlamp rim 20. The headlamp polarizing attachment also has three receptacles 36, 38, and 40 asymmetrically located around its periphery. The present invention contemplates the use of holes punched in the spherical shell 34 to accept the aiming bosses 26, 28, and 30. Thus, "receptacles," as used herein, includes a hole used for the specific purpose of receiving an aiming boss. FIG. 3 shows the polarizing attachment with holes 36H, 38H, and 40H to receive the aiming bosses 26, 28, and 30, respectively. The angle between the receptacle 40 and either of the receptacles 36 or 38 is about 125°, whereas the angle between the receptacle 36 and the receptacle 38 is about 110° (see FIG. 3). Each receptacle has a depth sufficient to receive an associated aiming boss without interference when the headlamp polarizing attachment 10 is fitted against the spherical lens 18 of the headlamp 12. It will now be understood that the headlamp polarizing attachment 10 and the headlamp 12 can fit together with just one orientation; if one rotates relative to the other, they cannot fit together.

The headlamp polarizing attachment is formed from a laminate 41 (see FIG. 2a) comprising a polarizing element 42, made from a thin sheet (about 0.05 mm thick) of stretch-oriented polyvinyl alcohol, treated in a well-known manner so it will transmit light with a specific polarization azimuth, between two supporting layers 44 and 46 of a thermoplastic material such as cellulose acetate butyrate. A total laminate thickness of 0.75 mm works quite well. The thermoplastic supporting layers 44 and 46 will mold to the desired shape and will thereafter retain that shape without effecting the properties of the polarizing element 42. The use of thermoplastic supporting layers 44 and 46 represents an important feature of the headlamp polarizing attachment 10 because the thinness of the polarizing element 42 renders it incapable of assuming and retaining the proper shape by itself. FIGS. 2a and 2b show a cross-section through the laminate 41 after the forming process which imparts to it the required shape for the headlamp polarizing attachment 10. Current engineering practice is to make the laminate 41 as a flat sheet and form it to the curved shape characteristic of the headlamp polarizing attachment 10 afterwards.

The thermoplastic material also protects the polarizing element from damage in manufacture and in use. It has been found that in actual service the polarizing element 42 needs no protection other than the thermoplastic layers 44 and 46. A headlamp polarizing attachment 10 according to the present invention successfully withstands repeated wiping and impacts from small stones without any appreciable effect on its utility. Further, the thermoplastic layers 44 and 46 tend to protect the glass headlamps from damage caused by flying stones.

The reader should understand that polarizing elements of other types will work as well as or better than polyvinyl alcohol. In particular, the present concept contemplates the use of multi-laminar interference polarizers of the type described and claimed in copending U.S. Pat. application Ser. No. 834,339, filed June 18, 1969, and assigned to Polaroid Corporation.

The transmission azimuth 48 of the polarizing element 42 is 45° from the horizontal (see FIG. 3) when the headlamp polarizing attachment 10 is fitted over a headlamp 12 on an automobile. Since the headlamp 12 is generally mounted with the aiming boss 30 down, the transmission azimuth 48 of the polarizing element 32 is at 45° to the horizontal when the headlamp polarizing attachment 10 is oriented with receptacle 40 down. Those knowledgeable in the operation of polarized anti-glare lighting systems for automobiles understand the choice of 45° and also that some circumstance might dictate the use of an angle other than 45°.

Another form of the headlamp polarizing attachment 10 contemplates the incorporation into the laminate of a quarter-wave retarding element 50 (see FIG. 2b) between the thermoplastic support layers 44 and 46 and on the concave side of the polarizing element 42. This positions the quarter-wave retarding element 50 between the polarizing element 42 and the reflector 24 when this form of the headlamp polarizing attachment 10 is fitted to the headlamp 12. U.S. Pat. No. 3,566,099, issued to Albert S. Makas, explains the advantages of this arrangement when the polarizing element 42 is a multi-laminar interference polarizer or a similar type.

In service, the rim 32 of the headlamp polarizing attachment 10 fits snugly between a seating flange 54 and a wedged front flange 56 of the gasket 12 (see FIG. 4). The flanges 54 and 56 join together at the outside edge of the gasket 14. The seating flange 54 separates the headlamp polarizing attachment 10 from the spherical lens 18. The air space formed therebetween insulates and protects the thermoplastic layers 44 and 46 and the polarizing element 42 of the headlamp polarizing attachment 10 from excessive operating temperatures which the filament in the headlamp 12 may generate. The bezel 16 fits around the headlamp 12 and its lip 52 engages the gasket 14. Tightening the bezel 16 into place so as to retain the headlamp 12 in an automobile draws the gasket 16 down onto the rim 20. This compresses the gasket 14 around the rim 32 and against the rim 20, sealing the headlamp polarizing attachment 10 to the spherical lens 18. Thus, neither dirt nor moisture will collect in the space between the spherical lens 18 and the spherical shell 34 to disperse light emitted by the headlamp 12.

FIG. 4 shows the outer edge of the gasket 14 to be about one-half again as thick as the inner edge. It has been found that this arrangement promotes the sealing of the headlamp polarizing attachment 10 to the headlamp 12 without regard to the shape of the lip 52 on the bezel 16. Thus, the gasket 14 performs equally well with any common automotive headlamp retaining bezel.

The gasket 14 is made from a flexible, resilient material such as rubber so as to promote a weather-tight seal. Fitting the headlamp polarizing attachment 10 between the flanges 54 and 56 supports the gasket 14 about its circumference and imparts the proper circular shape to it. Thus, the flexibility of the gasket 14 will not hamper its installation between the bezel 16 and the headlamp 12. The resilience of the gasket 14 distributes the clamping pressure, applied by the bezel 16, uniformly about the periphery of both the headlamp polarizing attachment 10 and the headlamp 12.

A METHOD FOR MAKING A HEADLAMP POLARIZING ATTACHMENT

Reference should be had to FIG. 1. The forming apparatus includes a clamping mechanism 102 which grips an oversize blank of the laminate 41 with uniform pressure around its edge. A latch 104 locks the clamping mechanism 102 during the process so the pressure on the laminate 41 will not change. Uniform gripping pressure all around the laminate 41 insures that the polarizing element 42 will be uniformly stretched when dies 108 and 110 draw the laminate 41 to form the spherical shell 34. Unequal stretching during the formation might adversely change the properties of the polarizing element 42.

A light box 106, with polarizer, is located beneath the laminate 41, and its polarization azimuth is oriented 90° to the desired orientation of the laminate 41, with respect to the dies 108 and 110. An operator can quickly orient the laminate 41 by rotating it until it extinguishes the light from the light box 106. It should be understood that the polarization azimuth of the light box 106 is predetermined in accord with the orientation of those parts in the dies 108 and 110 which will form the receptacles 36, 38, and 40 in the laminate 41.

The laminate 41, locked in the clamping mechanism 102, is moved on a slide 112 past the dies 108 and 110 into the heater (see FIG. 5b) so as to raise the temperature of the laminate 41. The exact temperature is determined in accord with the nature of the particular thermoplastic used in layers 44 and 46 so it will form readily to the shape of dies 108 and 110 when pressed between them and retain that shape afterwards. The heater radiates infra-red energy which the laminate 41 absorbs, thereby raising its temperature. A mirror 114 reflects back to the laminate 41 any energy not initially absorbed by it. The dies 108 and 110 are also heated to the same temperature so they will not cool the laminate 41 during the forming process and thereby reduce its formability.

When the laminate 41 and the dies 108 and 110 reach the proper forming temperature, the clamping mechanism 102 carries the laminate 41 between the dies 108 and 110. The dies 108 and 110 are next brought together, pressing the laminate 41 between them into the desired shape (see FIG. 5c). A vacuum pump removes air from the spaces in the die cavities to permit the laminate 41 to more accurately conform to the shape of the dies 108 and 110.

The formed laminate 41 can be trimmed to size after it is removed from between the dies 108 and 110; alternatively, specialized dies might trim the laminate 41 to size during the pressing step.

It can be readily understood that many variations and modifications of the present invention are possible in light of the aforementioned teachings, and it will be apparent to those skilled in the art that various changes in form and arrangement of components may be made to suit requirements without departing from the spirit and scope of the invention. It is, therefore, to be understood that within the scope of the appended claims, the instant invention may be practiced in a manner than otherwise specifically described herein.

What is claimed is:

1. An article for polarizing light emitted by a headlamp comprising:
    a concave sheet of linear light polarizing material having a unique polarization azimuth, and locating means, near the periphery thereof, for positioning said article with respect to said headlamp, said locating means having a predetermined orientation with respect to said polarization azimuth, said sheet of light polarizing material and said locating means being a single organically whole element.

2. The article described in claim 1, wherein said concave sheet has a spherical curvature.

3. The article described in claim 2, wherein said spherical curvature has a radius of approximately 12.5 cm.

4. The article described in claim 1, wherein said locating means are asymmetrically positioned on said concave sheet.

5. The article described in claim 4, wherein said headlamp has plural asymmetrically positioned aiming pads and said asymmetrical locating means comprises an equal number of receptacles in said sheet of linear polarizing material for receiving said aiming pads.

6. The article described in claim 5, wherein said predetermined orientation between said asymmetrical locating means and said polarization azimuth is such that said polarization azimuth is 45° to the horizontal plane when said polarizer is fitted to a headlamp mounted on an automobile.

7. The article described in claim 4, wherein said headlamp has plural asymmetrically positioned aiming pads and said asymmetrical locating means comprises a like number of apertures in said sheet of linear polarizing material for receiving said aiming pads.

8. A polarizing attachment for use with a lamp having at least one boss at a predetermined location on a surface of said lamp, comprising:
    a spherical shell which conforms to the shape of said lamp and which transmits light having a specified polarization azimuth and blocks light having a polarization azimuth orthogonal to said polarization azimuth;
    a rim surrounding said spherical shell and attached to the periphery thereof by which said spherical shell may be clamped together with said lamp; and
    at least one receptacle at the periphery of said spherical shell so as to receive said aiming boss.

9. The polarizing attachment described in claim 8, wherein said spherical shell comprises a laminate having a thin polarizing element between two thermoplastic layers, said thermoplastic layers having a thickness substantially greater than the thickness of said polarizing element.

10. The polarizing attachment described in claim 9, having plural receptacles asymmetrically spaced about the periphery of said spherical shell so as to receive plural bosses attached to said lamp in asymmetrically spaced positions.

11. The polarizing attachment described in claim 10, wherein said plurality of receptacles includes at least three of same and wherein two of said receptacles are separated by an angle of about 110° and each of said two is separated from the third receptacle by an angle of about 125°.

12. The polarizing attachment described in claim 10, wherein said specified polarization azimuth is 45° to a horizontal plane when said headlamp polarization attachment is fitted on a headlamp mounted on an automobile.

13. The polarizing attachment described in claim 9, wherein said thin polarizing element is a stretched oriented film of polyvinyl alcohol and said thermoplastic layers are cellulose acetate butyrate.

14. The polarizing attachment described in claim 9, wherein said thin polarizing element is a multi-laminar interference polarizer.

15. The polarizing attachment described in claim 14, further comprising a quarter-wave retarding element on the concave side of said multi-laminar interference polarizer toward said headlamp and co-extensive therewith.

16. The polarizing attachment described in claim 15, wherein said quarter-wave retarding element is between said thermoplastic layers.

17. The improvement, for use with a headlamp having at least one asymmetrically located aiming boss and a bezel that retains said headlamp in its position, comprising:
    a circular sheet of linear light polarizing material having a spherical curvature and a unique polarization azimuth;

asymmetrical locating means to receive said aiming boss, integral with said sheet of light polarizing material and near the periphery thereof, for positioning said article with respect to said headlamp, said asymmetrical locating means having a predetermined orientation with respect to said polarization azimuth;

means for separating said circular sheet of linear light polarizing material from said headlamp to form an air space therebetween; and means for sealing said circular sheet of linear light polarizing material to said headlamp to prevent the entry of moisture therebetween.

18. The improvement described in claim 17, further comprising a resilient gasket having a seating flange and a wedged flange, separated so as to accept a rim formed integrally with said circular sheet of linear light polarizing material, joined together at their outer edge and fitting within said bezel so when said bezel is drawn against said headlamp to retain said headlamp in position, it compresses said resilient gasket about said circular sheet of linear light polarizing material and against said headlamp forming a sealed air space therebetween, said gasket having an outer circumference half again as wide as its inner circumference.

19. The improvement described in claim 17, wherein said headlamp has plural asymmetrically positioned aiming pads and said asymmetrical locating means comprises an equal number of receptacles in said sheet of linear polarizing material for receiving said aiming pads.

20. The improvement described in claim 19, wherein said predetermined orientation between said asymmetrical locating means and said polarization azimuth is such that said polarization azimuth is 45° to the horizontal plane when said polarizer is fitted to a headlamp mounted on an automobile.

21. The polarizing attachment described in claim 8, wherein said receptacle is a hole shaped to receive said boss.

* * * * *